United States Patent [19]

Jost et al.

[11] Patent Number: 5,223,171
[45] Date of Patent: Jun. 29, 1993

[54] DETERGENT COMPOSITION CONTAINING A BIODEGRADABLE GRAFT POLYSACCHARIDE

[75] Inventors: Philippe Jost; Florence Tournilhac, both of Paris, France

[73] Assignee: Rhone Poulenc Chimie, Cedex, France

[21] Appl. No.: 721,788

[22] Filed: Jun. 26, 1991

[30] Foreign Application Priority Data

Jul. 2, 1990 [FR] France .................. 90 08319

[51] Int. Cl.$^5$ .............................................. C11D 3/22
[52] U.S. Cl. ............................................. 252/174.17
[58] Field of Search .................................... 252/174.17

[56] References Cited

U.S. PATENT DOCUMENTS

| | | |
|---|---|---|
| 3,558,499 | 1/1971 | Galvin et al. . |
| 3,766,165 | 10/1973 | Rennhard . |
| 3,989,656 | 11/1976 | Kamiya et al. . |
| 4,013,607 | 3/1977 | Dwyer et al. . |
| 4,167,488 | 9/1979 | Murtaugh ............... 252/156 |
| 4,263,180 | 4/1981 | Marconi et al. . |
| 4,480,025 | 10/1984 | Chang et al. . |
| 4,622,233 | 11/1986 | Torres . |
| 4,802,997 | 2/1989 | Fox et al. ............... 252/174.11 |

FOREIGN PATENT DOCUMENTS

| | | |
|---|---|---|
| 1937575 | 2/1971 | Fed. Rep. of Germany . |
| 2330026 | 1/1975 | Fed. Rep. of Germany . |
| 2277837 | 2/1976 | France . |
| 5155097 | 12/1980 | Japan ............... 252/174.17 |
| 1031498 | 2/1986 | Japan ............... 252/174.17 |

OTHER PUBLICATIONS

Chemical Abstracts, vol. 105, No. 2, Jul. 1986, Columbus, Ohio, USA, p. 109, column 1, ref. no. 8363; Japanese Patent Document No. 61-31497 dated Feb. 13, 1986, Sanyo Chemical Industries, Ltd. Collection of portions of articles, 9 total pages.

*Primary Examiner*—Olik Chaudhuri
*Assistant Examiner*—C. Everhart
*Attorney, Agent, or Firm*—Finnegan, Henderson, Farabow, Garrett & Dunner

[57] ABSTRACT

A detergent composition containing, as a "builder", a graft polysaccharide which consists essentially of a polydextrose having an average-weight molecular mass of less than 10,000 and onto which a water-soluble ethylenically unsaturated monomer is grafted.

9 Claims, No Drawings

DETERGENT COMPOSITION CONTAINING A BIODEGRADABLE GRAFT POLYSACCHARIDE

The present invention relates to a detergent composition containing, as a "builder", a graft polysaccharide which is at least partially biodegradable. This composition may be used for the formulation of detergents and cleaning products, in powder or liquid form.

"Builder" is understood to mean any constituent which improves the performance of surface agents in a detergent composition. In general, a "builder" has multiple functions:

within a detergent medium it ensures the removal of undesirable ions, in particular, alkaline-earth metal ions (e.g., calcium, magnesium), by sequestration or precipitation, it provides a reserve of alkalinity and ionic strength in order to prevent the precipitation of anionic surfactants, it keeps the soil extracted in suspension, and it prevents the wash from becoming encrusted with inorganic compounds.

For some time tripolyphosphates have been the "builders" most frequently used in detergent compositions and washing products. However, they are partly responsible for the eutrophication of lakes and slow-running water when they are not adequately removed by water treatment. Thus, their partial or total replacement is being sought.

Zeolites on their own are not able to replace the tripolyphosphates and must be reinforced by other additives.

Copolymers of acrylic acid and maleic anhydride (or their alkali metal or ammonium salts) have been proposed (European Patent No. 25,551) as incrustation inhibitors. However, they have the disadvantage of not being biodegradable in the natural environment.

The inventors have now found a detergent composition which has excellent primary and secondary detergent properties and which comprises a "builder" which is at least partially biodegradable.

According to the present invention, the composition is a detergent composition comprising a "builder" and a surfactant, wherein the "builder" includes a graft polysaccharide comprising, a polymer backbone consisting essentially of a polydextrose having an average-weight molecular mass of less than 10,000 and preferably of from 100 to 5,000, and from 20 to 70%, preferably from 25 to 35%, by weight of the polymer backbone, of grafts grafted thereon derived from at least one water-soluble ethylenically unsaturated monomer.

Polydextrose is a random glucose polymer containing small amounts of sorbitol and citric acid, obtained by polycondensation of these three starting materials (e.g., glucose, sorbitol and citric acid). It is used in the foodstuff art as a complement to synthetic sweeteners. It is also the subject of U.S. Pat, Nos. 3,766,165 and 4,622,233.

The water-soluble ethylenically unsaturated monomers capable of forming the repeating units of the grafts include those containing at least one hydrophilic group, such as:

ethylenically unsaturated carboxylic mono-acids (e.g., acrylic acid, methacrylic acid and their alkali metal or ammonium salts), ethylenically unsaturated carboxylic diacids (e.g., maleic acid, itaconic acid, fumaric acid, crotonic acid and their alkali metal or ammonium salts), ethylenically unsaturated carboxylic hydroxy acids (e.g., hydroxyacrylic acid and their alkali metal or ammonium salts), ethylenically unsaturated sulphonic acids (e.g., vinylsulphonic acid, allylsulphonic acid and their alkali metal or ammonium salts), and ethylenically unsaturated alcohols (e.g., allyl alcohol, methallyl alcohol).

Preferably, the grafts consist of:

a homopolymer of acrylic or methacrylic acid, a copolymer of acrylic or methacrylic acid and maleic or itaconic acid in a monoacid/diacid molar ratio of 50-95/50-5, preferably 55-90/45-10, and an alkali metal (in particular, sodium) or ammonium salt of the homopolymer or the copolymer.

Advantageously, the grafts contain on the average from 3 to 50, preferably on the average from 10 to 20, monomer units per graft.

Graft polydextrose can be obtained by any known process for grafting ethylenically unsaturated monomers onto polysaccharides. The grafting may be effected by irradiation or by free radical polymerization in aqueous solution with the aid of initiators of the hydrogen peroxide or persulphate type, such as sodium persulphate, potassium persulphate or ammonium persulphate, or of a cerium (IV) salt.

One grafting method which performs particularly well is that using a water-soluble or water-dispersible Ce(IV) salt.

The operation takes place in an aqueous medium and preferably in an aqueous solution of nitric or sulphuric acid having an acid concentration of from 0.005 to 0.1 mole/liter. The pH of the reaction mixture is from 1 to 2.

The Ce(IV) salt is preferably ceric nitrate, ceric sulphate, $Ce(SO_4)_4(NH_4)_4$ and $Ce(NO_3)_6(NH_4)_2$.

The mechanism by which unsaturated monomers are grafted onto polysaccharides in the presence of cerium (IV) salts has been described by Munmaya K. Mishra in Rev. Macromol. Chem. Phys. C22(3), 471–513 (1982–1983) and also by Samal et al. in Rev. Macromol. Chem. Phys., C26(1), 81–141 (1986).

The Ce(IV) salt is used generally in an amount of from 10 to 300 mmol of $Ce^{4+}$, preferably from 40 mmol to 250 mmol of $Ce^{4+}$, per 100 g of polydextrose backbone.

The nature of the polydextrose which is subjected to the grafting operation as well as the water-soluble ethylenically unsaturated monomers that may be used have already been mentioned above.

The amounts of monomer(s) used are from 20 to 70% by weight, preferably from 25 to 35% by weight, relative to the weight of the polydextrose.

The total concentration of polydextrose and ethylenically unsaturated monomer(s) in the aqueous polymerization mixture is such that the latter has a solids content by weight of from 5 to 40%, preferably from 15 to 20%, of its total weight.

The operation of grafting by polymerization is generally carried out at a temperature of from 20° to 60° C. and more particularly from 35° to 45° C. The polymerization generally takes from 2 to 4 hours.

The operation can be carried out noncontinuously or continuously with continuous introduction of the ethylenically unsaturated monomer or monomers into a base stock containing the aqueous medium, the polydextrose and the initiator. When a mixture of monomers such as acrylic acid and maleic acid is used, some of the acrylic acid and all of the maleic acid can be introduced initially into a base stock containing the aqueous medium, the polydextrose and the initiator and then the remainder of the acrylic acid introduced semi-continuously.

After cooling, the product obtained at the end of the polymerization is in the form of a solution of low viscosity. The product is at least partially biodegradable in a natural environment and has good sequestration properties for cations, in particular, calcium and magnesium, and also inhibits crystal growth, in particular, of calcium carbonate.

The amount of graft polydextrose present in the detergent composition which is the subject of the present invention generally ranges from 0.2 to 80%, preferably from 2 to 5%, by weight of the detergent composition.

The amount of surfactant present in the detergent composition of the present invention ranges from 2 to 50%, preferably from 6 to 30%, by weight of the detergent composition when the latter is a powder or from 20 to 50% when the latter is liquid.

The surfactants which can be used in the detergent composition include the following:

anionic surfactants such as alkali metal soaps (alkali metal salts of $C_8$–$C_{24}$ fatty acids), alkali metal sulphonates ($C_8$–$C_{13}$ alkylbenzenesulphonates, $C_{12}$–$C_{16}$ alkylsulphonates), oxyethylenated and sulphated $C_6$–$C_{16}$ fatty alcohols and oxyethylenated and sulphated $C_8$–$C_{13}$ alkylphenols, and alkali metal sulphosuccinates ($C_{12}$–$C_{16}$ alkyl-sulphosuccinates);

nonionic surfactants such as polyoxyethylenated $C_6$–$C_{12}$ alkylphenols, oxyethylenated $C_8$–$C_{22}$ aliphatic alcohols, ethylene oxide/propylene oxide block copolymers and carboxylic amides which may be polyoxyethylenated;

amphoteric surfactants of the alkyldimethylbetaine type; and cationic surfactants such as alkyltrimethylammonium or alkyldimethylethylammonium chlorides or bromides.

Various additives can optionally be added to the detergent composition described above in order to obtain detergents or cleaning products in powder or liquid form.

Thus, the following may also be present in the detergent composition:

"Cobuilders" of the following type:
phosphates in an amount of less than 25% of the total weight of the formulation,
zeolites in an amount of up to about 40% of the total weight of the formulation,
sodium carbonate in an amount of up to about 80% of the total weight of the formulation,
nitriloacetic acid in an amount of up to about 10% of the total weight of the formulation, and
citric acid or tartaric acid in an amount of up to about 20% of the total weight of the formulation, with the total amount of "builder" (graft polydextrose+cobuilders) corresponding to about 0.2 to 80%, preferably from 20 to 45%, of the total weight of the detergent composition, corrosion inhibitors, such as silicates, in an amount of up to about 25% of the total weight of the detergent composition, bleaching agents of the perborate, chloroisocyanate or N,N,N',N'-tetraacetylethylenediamine (TAED) type, in an amount of up to about 30% of the total weight of the detergent composition, antiredeposition agents of the carboxymethyl cellulose or methyl cellulose type, in amounts of up to about 5% of the total weight of the detergent composition, antiincrustation agents of the type comprising copolymers of acrylic acid and maleic anhydride, in an amount of up to about 10% of the total weight of the detergent composition, fillers of the sodium sulphate type in the case of the detergents in powder form, in an amount of up to 50% of the total weight of the detergent composition, and water in the case of the liquid detergents, in an amount of up to 80% of the total weight of the detergent composition.

The detergent composition which is the subject of the present invention has good efficacy with respect to primary detergents (removal of the soiling at the end of a washing cycle) and with respect to secondary detergents (antiredeposition and antiincrustation after several washing cycles).

The following examples are given by way of illustration and should not be regarded as limiting the scope or the spirit of the present invention.

EXAMPLE 1

The experiment was carried out batchwise in a 100 ml conical flask placed in a KOTTERMAN ® agitation bench (marketed by Labo service), using:

5 g of partially neutralized polydextrose powder of K type marketed by Pfizer (a 10% aqueous solution has a pH of 5-6). Its molecular distribution by weight is such that almost 90% of the product has a weight molecular mass of less than 5000.

2.5 g of acrylic acid 40 mmol of $Ce^{4+}$ per 100 g of polydextrose, in the form of ammonium $Ce^{IV}$ sulphate 0.035 mole per liter of nitric acid water in the amount required to obtain a solids content of 27% by weight.

The various ingredients were mixed and the solution brought to 40° C. for two hours and then left to cool.

The capacity of the product obtained for sequestration of calcium ions was measured using an electrode having a selective membrane permeable to calcium ions. A calibration curve was first plotted using 100 ml of a 3 g/l sodium chloride solution of pH 10.5 to which amounts of calcium ions varying from $10^{-5}$ to $3 \times 10^{-3}$ mol/l were added and the curve of the potential supplied by the electrode as a function of the concentration of free $Ca^{2+}$ ions was plotted.

0.1 g of polymer (dry) was then weighed, to which water, in the amount required to obtain 100 g of solution, and 0.3 g of sodium chloride in powder form were added. The pH was then adjusted to about 10.5 using sodium hydroxide in aqueous solution.

The straight line free $[Ca^{2+}]$/fixed $[Ca^{2+}]$=function (free $[Ca^{2+}]$) was plotted.

Using this straight line, the following were determined:

the complexing constant K of the calcium ions in the polymer the number So of complexing sites in the polymer defined by $$\frac{\text{free [Ca}^{2+}\text{]}}{\text{fixed [Ca}^{2+}\text{]}} = \frac{1}{KSo} + \frac{1}{So}\text{ free [Ca}^{2+}\text{]}$$

It was found that the product obtained had:
a number of complexing sites $So = 2 \times 10^{-3}$ sites/g of graft polydextrose.
a complexing constant $\log K = 3.6$.

EXAMPLE 2

The operation described in the preceding example was repeated using, as the starting materials:
5 g of polydextrose of K type
10 g of acrylic acid
40 mmol of $Ce^{4+}$ per 100 g of polydextrose, in the form of ammonium $Ce^{IV}$ sulphate
0.035 mole per liter of nitric acid
water in the amount required to obtain a solids content of 21% by weight.
The product obtained had,
a number of complexing sites $So = 3.1 \times 10^{-3}$ sites/g
a complexing constant $\log K = 4.1$.

The calcium carbonate crystallization-inhibiting property of this product was demonstrated using the method described by Z. Amjad in Langmuir 1987, 3, 224–228.

The determination was carried out in a thermostat-controlled closed cell using a supersaturated solution containing $10^{-3}$ mol/l of sodium bicarbonate and $2 \times 10^{-3}$ mol/l of calcium chloride (pH = 8.6), to which 5 g/l of synthetic calcium carbonate (specific surface area = 80 m²/g; theoretical diameter = 20 nm) were added. The reduction in the rate of crystallization of the calcium carbonate obtained by addition of 500 ppm (expressed as the solid) of the graft polydextrose prepared above was determined.

It was found that the ratio: desorption constant $k_d$/adsorption constant $k_a = 0.06$.

EXAMPLE 3

The experiment was carried out semi-continuously at 40° C. in a 250 ml reactor. A base stock was formed using:
15 g of polydextrose of K type
0.065 mole per liter of nitric acid
0.83 g of ammonium $Ce^{IV}$ nitrate
97 g of water.

The following were introduced semi-continuously in the course of 1 hour
7.5 g of acrylic acid
7.5 g of water The solids content of the mixture is 16% by weight. The mixture was kept at 40° C. for an additional 1 hour.
The product obtained had:
a number of complexing sites $So = 2 \times 10^{-3}$ sites/g
a complexing constant $\log K = 4.1$.

EXAMPLE 4

The experiment described in Example 3 was carried out using a base stock containing:
15 g of polydextrose of K type
0.06 mole per litre of nitric acid
17.75 g of ammonium $Ce^{IV}$ nitrate
97 g of water
and introducing
7.5 g of acrylic acid
7.5 g of water
semi-continuously into the base stock.

The solids content of the mixture was 22% by weight.

The product obtained had:
a number of complexing sites $So = 1.1 \times 10^{-3}$ sites/g
a complexing constant $\log K = 4.2$.

EXAMPLE 5

The operation described in Example 1 was carried out using:
5 g of polydextrose of K type
2.5 g of acrylic acid
80 mmol of $Ce^{4+}$ per 100 g of polydextrose, in the form of ammonium $Ce^{IV}$ sulphate
0.035 mol/l of nitric acid
water in the amount required to obtain a solids content of 20% by weight.

The product obtained had:
a number of complexing sites $So = 1.4 \times 10^{-3}$ sites/g
a complexing constant $\log K = 3.9$ Its calcium carbonate crystallization-inhibiting property corresponded to a ratio: desorption constant $k_d$/absorption constant $k_a = 0.11$.

EXAMPLE 6

The operation described in Example 1 was carried out using:
5 g of polydextrose of K type
2.5 g of acrylic acid
10 mmol of $Ce^{4+}$ per 100 g of polydextrose, in the form of ammonium $Ce^{IV}$ nitrate
0.06 mol/l of nitric acid
water in the amount required to obtain a solids content of 20% by weight.

The product obtained had:
a number of complexing sites $So = 1.5 \times 10^{-3}$ sites/g
a complexing constant $\log K = 4.1$.

The "final" biodegradability of this product was determined in accordance with the AFNOR standard T90-312 (in conformity with the international standard ISO 7827).

The test was carried out using, as starting materials:
an inoculum obtained by filtration of feed water from the municipal treatment station of Saint Germain au Mont d'Or (Rhone).
a test medium containing $4 \times 10^7$ bacteria/ml
an amount of product to be tested such that the test mixture contained a concentration of organic carbon of 40 mg/l.

The degree of biodegradability of the product tested as a function of time is as follows:

| TIME (days) | BIODEGRADABILITY (%) |
| --- | --- |
| 0 | 0 |
| 2 | 13 |
| 5 | 31 |
| 9 | 31 |
| 13 | 33 |
| 22 | 44–47 |
| 28 | 44–47 |

EXAMPLE 7

The operation described in Example 1 was repeated using, as starting materials:
5 g of polydextrose of K type
2.5 g of acrylic acid 100 mmol of $Ce^{4+}$ per 100 g of polydextrose, in the form of ammonium $Ce^{IV}$ sulphate 0.03 mol/l of nitric acid water in the amount required to obtain a solids content of 20%.

The product obtained had:

a number of complexing sites $So=2\times10^{-3}$ sites/g a complexing constant log $K=3.5$ a degree of biodegradability as a function of time of

| TIME (days) | BIODEGRADABILITY (%) |
|---|---|
| 0 | 0 |
| 7 | 46 |
| 14 | 53 |
| 21 | 53 | a desorption constant $k_d$/absorption constant $k_a$ ratio $=0$.

EXAMPLE 8

The effect of the product of Example 7 as an incrustation inhibitor was demonstrated as follows.

The incrustation of a TESTFABRIC 405 cotton textile was evaluated after 20 washings in a washing machine using a standard powder detergent containing 24% by weight of zeolite 4 A and 3% by weight of graft polysaccharide to be tested. The washings were carried out at 75° C. and followed by drying.

The incrustation with inorganic compounds was calculated from the ash content of the washed fabrics which were burned at 950° C. for 3 hours.

| Composition of the detergent | % by weight |
|---|---|
| straight-chain alkylbenzene sulphonate | 7.5 |
| CEMULSOL LA 90 ® (polyoxyethylenated lauric acid marketed by S.F.O.S.) | 4 |
| Zeolite 4 A | 24 |
| Na silicate ($SiO_2/Na_2O = 2$) | 1.5 |
| Na carbonate | 10 |
| TAED | 0.1 |
| Na perborate | 15 |
| ethylenediamine tetraacetate | 0.9 |
| product to be tested | 3 |
| Tinopal DMSX ® (blueing agent marketed by CIBA-GEIGY) | 0.1 |
| Tinopal SOP ® (blueing agent marketed by CIBA-GEIGY) | 0.1 |
| silicone-containing antifoam | 0.2 |
| alkalase (enzyme) | 0.15% |
| savinase (enzyme) | 0.15% |
| Na sulphate | qsp 100% |

The results are as follows:

| product to be tested | Ash content* |
|---|---|
| control (without graft polysaccharide) | 2.62 |
| graft polysaccharide of Example 7 | 1.40 |

* - % relative to the total weight of the cotton

What is claimed is:

1. A detergent composition comprising a builder and a surfactant, wherein said builder includes a graft polysaccharide comprising:
   a polymer backbone consisting essentially of a polydextrose having an average-weight molecular mass of less than 10,000
   and from 20 to 70% by weight of said polymer backbone, of grafts grafted thereon derived from at least one water-soluble ethylenically unsaturated monomer.

2. The detergent composition according to claim 1, wherein
   said polydextrose has an average-weight molecular mass of from 100 to 5,000, and
   wherein 25 to 35 % by weight of the said polymer backbone, of said grafts are present.

3. The detergent composition according to claim 1 wherein said grafts contain on the average from 3 to 50 monomer units per graft.

4. The detergent composition according to claim 1 wherein said water-soluble ethylenically unsaturated monomer is selected from the group consisting of
   an ethylenically unsaturated carboxylic mono-acid.
   an ethylenically unsaturated carboxylic diacid,
   an ethylenically unsaturated carboxylic hydroxyacid,
   an ethylenically unsaturated sulphonic acid,
   an alkali metal or ammonium salt of these acids, and
   an ethylenically unsaturated alcohol.

5. The detergent composition according to claim 4, wherein said water-soluble ethylenically unsaturated monomer is selected from the group consisting of
   acrylic acid,
   methacrylic acid,
   a mixture of acrylic or methacrylic acid as a monoacid and a maleic or itaconic acid as a diacid in a molar ratio of monoacid/diacid of 50-95/50-5, and
   an alkali metal or ammonium salt of these acids.

6. The detergent composition according to claim 1, containing from 0.2 to 80% of said graft polysaccharide by weight of said detergent composition.

7. The detergent composition according to claim 6, containing from 2 to 5% of said graft polysaccharide by weight of said detergent composition.

8. The detergent composition according to claim 1, containing from 2 to 50% of said surfactant by weight of said composition when said composition is a powder and from 20 to 50% by weight of said composition when said composition is a liquid.

9. The detergent composition according to claim 1, wherein said composition contains less than 25% by weight of phosphates.

* * * * *